Aug. 23, 1949.　　　K. C. BUGG　　　2,479,554
VALVE
Filed June 16, 1948　　　　　　　　2 Sheets-Sheet 1
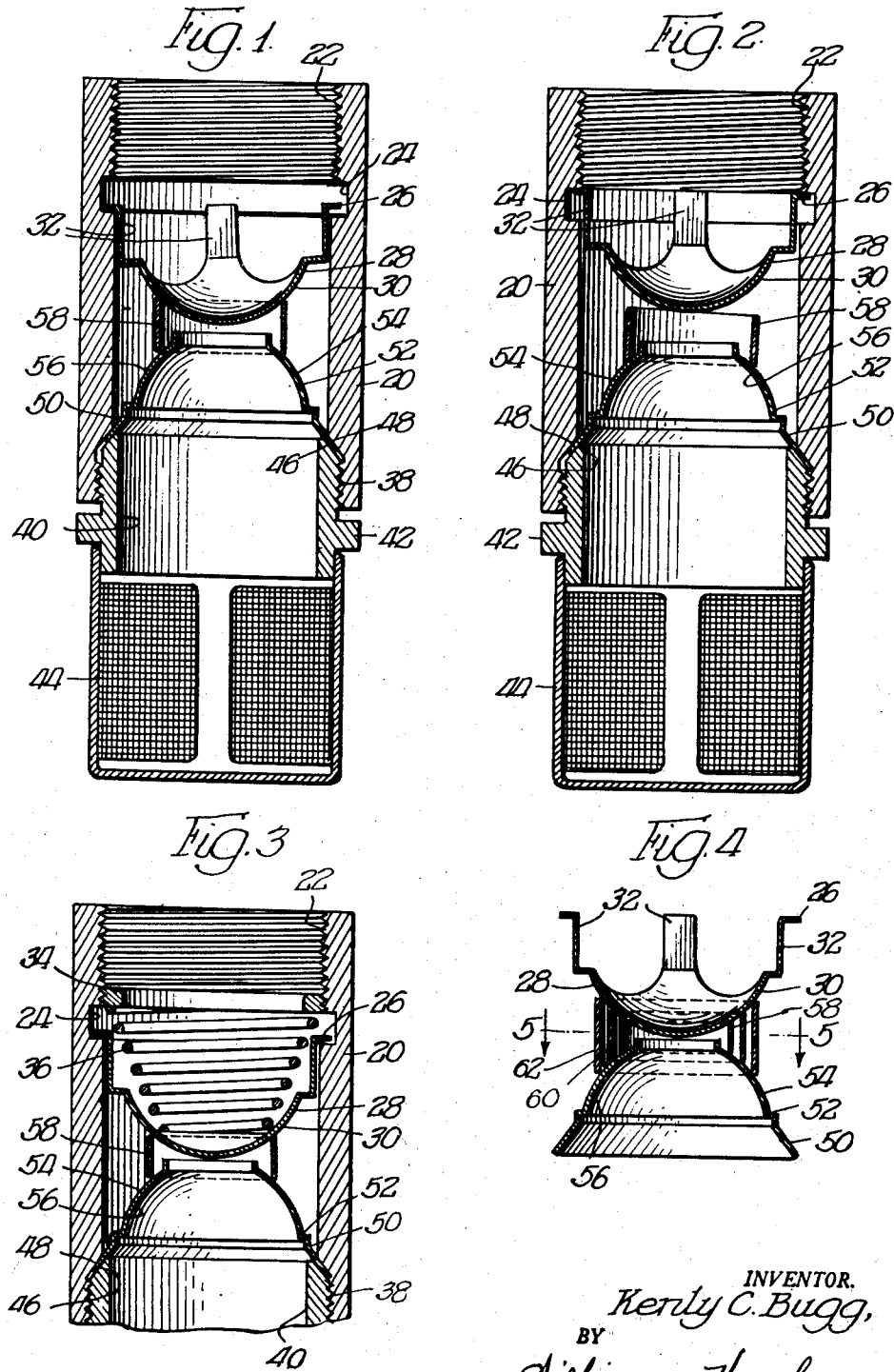
INVENTOR.
Kenly C. Bugg,

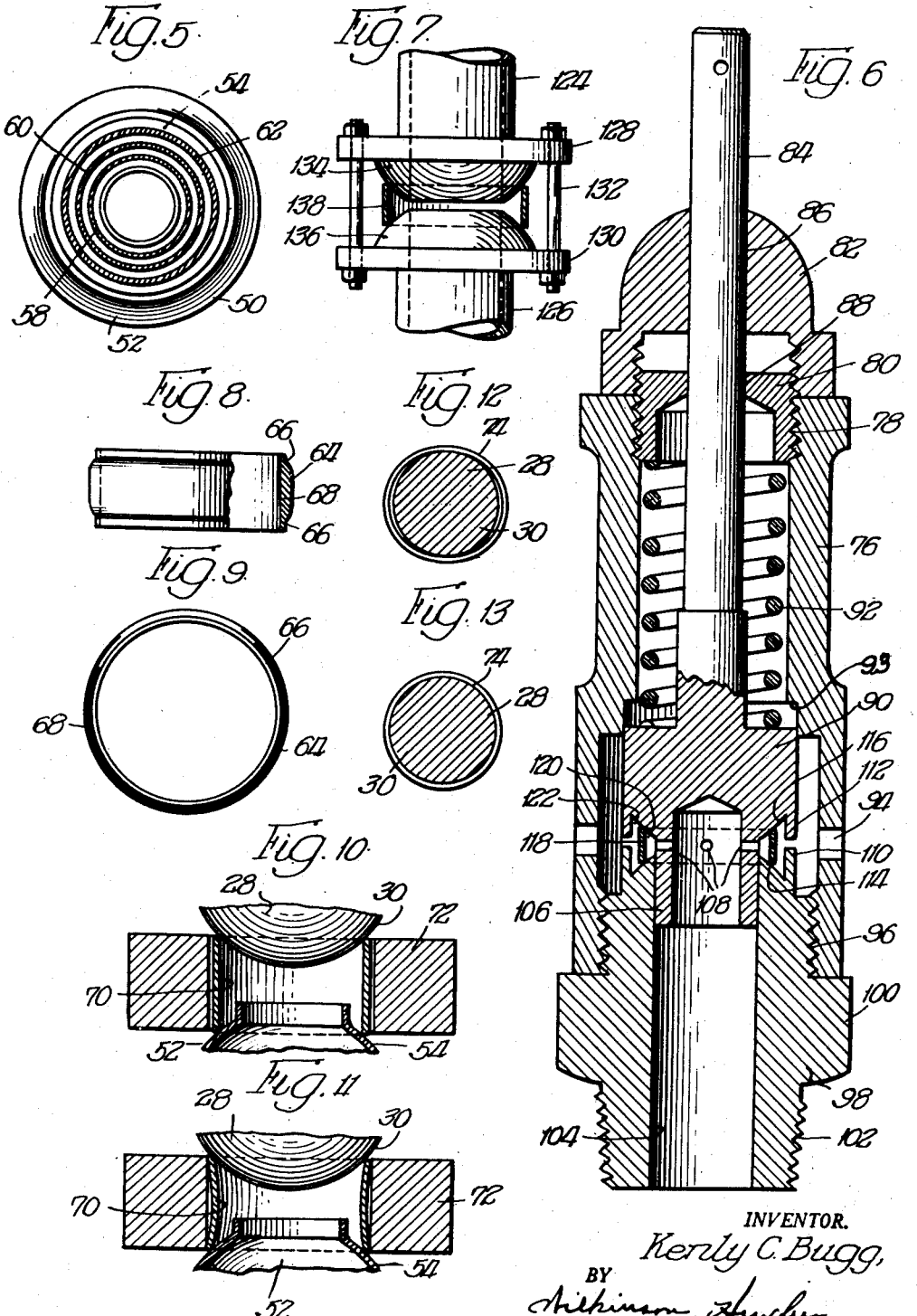

Patented Aug. 23, 1949

2,479,554

UNITED STATES PATENT OFFICE 2,479,554

VALVE

Kenly C. Bugg, Fort Wayne, Ind., assignor to Kendick Manufacturing Company, Inc., Fort Wayne, Ind., a corporation of Indiana Application June 16, 1948, Serial No. 33,255

20 Claims. (Cl. 251—167)

This invention pertains to closure mechanism, and more particularly to valve or joint mechanism which effects tight and positive closure.

In valve mechanism it is usual to have a fixed seat member and a poppet or movable member which is adapted to seat thereon. In joint mechanism for connecting pipes or the like it is not unusual to provide two fixed seat members made tight by a malleable member which deforms to take a permanent set in order to obtain the proper tightness. In both the valve and joint mechanisms the members must be fitted tightly together so that an expensive machining operation must be used where the parts are to have metal to metal contact, or plastic inserts must be used. Due to the nature of such inserts, after a relatively short use they must be replaced. Many valves in use, even though very expensive, do not wear properly, due to change in pressure, change in temperature, etc., causing leakiness and wiredrawing.

It is therefore an object of this invention to provide a closure, valve or joint device wherein the device may be finished without expensive machining. For example, the parts may be die cast, plated and buffed to afford the necessary hardness and to provide the necessary resistance to wear and corrosion, or the same result may be attained by anodically treating the parts.

Another object of the invention is to provide a valve construction wherein the valve and valve seat are so constructed and arranged that they provide the proper holding condition with a floating member which need not be guided.

Another object of the invention is to provide a valve construction wherein the valve comprises fixed and movable seats and a floating valve member which is operative to effect proper closure regardless of the relative axial positions of the members and regardless of temperature distortion.

Another object of the invention is to provide a valve construction comprising fixed and movable seats and a closure member so related to the fixed and movable seats that it need not seat at exactly the same places each time to effect a tight closure so that by this construction means is provided wherein the seats are wiped and cleaned every time the valve is operated.

Another object of the invention is to provide a valve construction comprising fixed and movable seat members having segmental, spherical surfaces adapted to be closed by a flexible, substantially cylindrical ring which is free to move between both surfaces when the valve is opened, is aligned by the two spherical surfaces during closing, and in closing the ring is centered or conformed to the spherical surfaces, thus squeezing off the pressure gradually around the movable member and fixed member, thus preventing chattering.

Another object of the invention is to provide a valve construction providing fixed and movable seat members, and a floating ring for effecting closing, the ring being as flexible or springy as possible in the direction normal to its axis, the ring being no thicker and of no greater hardness than is necessary to withstand the pressure of the valve. Further, the construction is such that the pressures, both internal and external, equalize over the ring so that the ring is never subjected to stress above its elastic limit.

Another object of the invention is to provide a valve construction wherein fixed and movable seat members are provided, said seat members being of a segmental, spherical shape, a flexible ring being provided for effecting closure control, the ring being of sufficient length, flexibility and springiness (being never malleable or ductile) to conform to the shape of the seats when the valve is closed even though they may be deformed slightly in use.

Another object of the invention is to provide a valve construction comprising fixed and movable members and a ring-like or substantially cylindrical closure member disposed therebetween and co-operating therewith for effecting flow control, the parts being preferably of the same material (and they may be of the same hardness) whereby cororsion by galvanic action (electrolysis) is prevented.

Another object of the invention is to provide a valve construction wherein fixed, movable and floating parts are utilized, the parts being so arranged that the valve construction properly operates regardless of the position in which the valve construction is used and regardless of temperature.

Another object of the invention is to provide a valve construction adapted to have long life and to properly operate under the conditions for which it is designed, the construction being such that the parts can be inexpensively manufactured and maintained (even though metal to metal contact may be used) and expensive machining is eliminated. Thus the necessity for use of expensive inserts can be avoided, which inserts are generally unsatisfactory as they distort, especially where a plastic or a malleable insert is used.

Another object of the invention is to provide a valve construction wherein a closure member is provided which operates to compensate for any roughness or unevenness between associated parts in the valve, thereby providing inexpensive means for obtaining the valve in proper operation.

Another object of the invention is to provide a valve construction which need not necessarily be made expensively, as the parts may be constructed from various standard parts and may be adapted to stamping, die casting, or easy machining practises, and a drawn or machined tube may be used as the valve sealing means.

Another object of the invention is to provide a valve construction wherein the parts are so constructed and relatively arranged that during flow control the parts relatively align and wipe clean the adjacent sealing surfaces so that the sealing surfaces are cleaned and choking is eliminated to the highest possible degree.

Another object of the invention is to provide a valve construction wherein the principle thereof is adapted to be utilized with substantially any type of valve wherein it may be utilized to handle fluids of high or low viscosity at high or low temperatures.

Another object of the invention is to provide a valve construction wherein fixed and movable seat members are provided having facing segmental, spherical surfaces, the sealing means between said surfaces being one or more flexible, resilient rings providing one or more huddling chambers to affect the valve opening and flow, the parts cooperating upon closing operation to help realign the sealing means without undue shock on any particular part of the valve construction.

Another object of the invention is to provide a valve construction wherein fixed and relatively movable seats are used having facing segmental, spherical surfaces and a floating closure means is disposed therebetween. The closure means may be in the form of a flexible resilient ring which need not be exactly circular in section; it may be reenforced so that it will not be forced beyond its yield point; it may be so constructed and arranged that the edges contacting the spherical surfaces are relatively thin for resilience and conformation contact; the body between the edges may be thickened to receive greater pressure loads, the contact between the edges and the adjacent valve surfaces being a line contact which gives a greater seal and effects cleaning of the contacting surfaces, the diameter of the ring being such that at its point of contact with the spherical surfaces the tangent thereto is substantially 45 degrees.

Another object of the invention is to provide a valve construction wherein changes in temperature do not affect the proper operation thereof.

Another object of the invention is to provide a joint connection wherein the parts are so constructed and arranged that they fulfill all of the advantages above enumerated for a valve construction.

With these and various other objects in view, the invention consists of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a sectional elevation of a foot valve construction embodying the invention, showing the parts in position wherein the valve is closed;

Figure 2 is a sectional elevation of a foot valve construction embodying the invention, showing the parts in position wherein the valve is open;

Figure 3 is a fragmentary sectional elevation, corresponding to Figure 1, showing a modified form of foot valve construction embodying the invention;

Figure 4 is a sectional elevation showing a fixed and movable seat member, similar to that illustrated in Figures 1 to 3 inclusive, but wherein multiple seal ring valve members are utilized;

Figure 5 is a sectional plan view taken substantially in the plane as indicated by the line 5—5 of Figure 4;

Figure 6 is an enlarged sectional elevation of a safety valve embodying the invention;

Figure 7 is an elevation, partly in section, of a pipe joint embodying the invention;

Figure 8 is an elevation, partly in section, of a modified form of seal ring, showing a one-piece ring construction having relatively thin edge portions and relatively thicker reenforcing means intermediate the ends;

Figure 9 is a top plan view of the ring illustrated in Figure 8;

Figure 10 is a fragmentary, sectional elevation showing the flexible, resilient seal ring valve member reenforced by a relatively unyieldable heavy reenforcing ring, the movable seat member being shown in position just prior to fully seating or closure position;

Figure 11 is a fragmentary, sectional elevation, corresponding to Figure 10, showing the parts in fully closed position;

Figure 12 is a plan view showing a seal ring and one of the seating members in position prior to seating and wherein the seal ring is not circular, but is flexible and resilient; and Figure 13 is a view corresponding to Figure 12, but showing the parts in fully seated position, wherein the flexible, resilient ring has assumed its circular condition, or the condition conforming to the shape of the adjacent seat.

Referring first of all, more particularly, to the foot valve construction illustrated in Figures 1 to 5 inclusive, the valve consists essentially of a casing 20, which may be shouldered (not shown) for application of an assembling tool, and is threaded adjacent the top thereof as at 22 for application to one end of an intake pipe, such as a suction stub of a liquid dispensing device pump, or the like.

The casing is groove as at 24 for the reception of the outwardly directed retaining flanges 26 of the movable seat member 28, the member being shown as a stamping, the axial depth of the groove 24 being such as to permit proper opening and closing operation. The upper shoulder 29 limits upward movement of member 28 as shown as in Figure 2. The movable seat member 28 is provided with the depending closure surface 30 which is preferably the segment of a sphere, the closure surface being provided with the upwardly extending legs 32 provided with said flanges 26.

In the construction shown in Figure 3 a removable and adjustable spring seat member 34 is threaded into position on the threads 22 and forms the upper seat for the spring 36, the lower end of the spring 36 seating within the seat member 28 urging said seat member toward closed position.

The casing 20 is also provided with the lower threaded portion 38 adapted to receive the complementary threads of the lower valve fitting 40, said fitting being provided with the shoulders 42 to facilitate application thereof to the casing 20 and having affixed thereto a screen 44.

Fitting 40 adjacent the top thereof and casing 20 adjacent the threads 38 are provided with the upwardly extending complementary shoulders 46 and 48 forming securing means for the lower flange 50 of the fixed seat member 52. Seat member 52 is provided with the upwardly directed segmental spherical seat member 54 extending toward seat surface 30. Fixed seat member 52 is provided with the passage 56 extending therethrough whereby flow of fluid can pass therethrough, thence between the legs 32, and thereafter upwardly of the suction stub.

In order to effect closure of the valve member a flexible, resilient, substantially cylindrical ring or sleeve 58 is provided, the sleeve being of a material preferably the same as that of the associated valve parts, but being springy, resilient or flexible, and not ductile or malleable. (In the drawings the ring 58, and the other similar rings, to be later referred to, are shown of exaggerated thickness, it being understood, of course, that they are of the necessary thinness, length and other characteristics to fulfill the described requirements.) The ring 58 is preferably of a length to permit the flexible ring to accommodate itself to the shape of the fixed and movable seats 52 and 28; is strong enough to withstand the compression forces between the fixed and movable seats, and the delivered fluid need not be exactly cylindrical because its contact over the spherical surfaces 30 and 54 is always circular; and is of sufficient diameter so that at the point of contact between the edges of the ring and the spherical surfaces 30 and 54 the tangent thereto is 45 degrees to the axis of the seat members.

In Figure 4 ring 58 may be supplemented by a plurality of rings 60 and 62, the rings 60 and 62 providing multiple seals and compression holding caps for the valve assembly. The rings 58, 60 and 62 are preferably so arranged that the inner rings are highly resilient and give a high performance of sealing, the outer ring completely seating slightly after the full sealing of the inner rings, but the outer ring being heavier to take substantially the full compression load after the inner, more resilient rings have performed their sealing functions.

Ring 58 may be replaced by the ring 64 illustrated in Figures 8 and 9, wherein the upper and lower edges 66 of said ring are relatively narrow so that they are very flexible to properly conform to the sperical surfaces 30 and 54, the ring 64 being thickened intermediate the ends thereof as at 68 to avoid resistance to compression. Any preferred thickening may be utilized as stepped, gradual, parabolic, etc., depending upon the stresses to be accommodated.

As shown in Figures 10 and 11, ring 70 which is highly flexible and resilient and similar to ring 58 may be reenforced by a heavy compression ring 72, the diameter of the hole in ring 72, which is shown exaggerated in Figures 10 and 11, being such that it will permit the inner ring 70 to deform as shown in Figure 11 when the seat member 28 moves toward closing position. This deformation causes the inner ring 70 to form a seal between the fixed and movable seats as shown in Figure 11, and thereafter causing the outer ring to take the compression stresses.

As illustrated in Figures 12 and 13, ring 74, similar to ring 58, need not be initially, exactly circular, in section, because due to its flexibility and resilience when the seat member 28 moves from the open position, as illustrated in Figure 12, to its fully closed position as shown in Figure 13, ring 74 will conform to the shape (shown substantially circular) of the substantially spherical seat member.

In operation of the valves illustrated in Figures 1 to 4, therefore, when the valve is in closed position as illustrated in Figure 1, seat member 28 will engage the upper edge of the flexible, resilient ring or sleeve 58 over a circle, with a line contact, and due to the fact that the surface 30 is a segment of a sphere, it is not necessary that either the seat member 28 be guided, or that the axis of the flexible sleeve be exactly vertical or coincidental with that of the valve, or is it necessary that the ring 58 be exactly cylindrical. It will likewise conform over a circular line over the spherical surface 54 of the fixed seat member 52. When the valve is opened as shown in Figure 2, the fluid may pass upwardly through the screen 44, past the fixed and movable seat members 52 and 28 and sleeve 58, and thence outwardly of the valve assembly. In Figure 3 the valve is urged toward closed position by the spring 36; and in Figures 4 and 5 the multiple rings are utilized for the purpose above described, and in addition form huddling chambers for effecting operation of the valve. It is understood, of course, that the spring 36 shown in Figure 3 may be used in the construction shown in Figure 4. With such valves the action is such that opening and closing will be effected positively and without chattering.

In Figures 8 to 13 inclusive, the rings and valve members operate in the manner already described.

Referring now to the relief valve illustrated in Figure 6, the valve comprises the housing 76 threaded adjacent the upper end thereof for reception of corresponding threads of the seat and guide member 80. A bonnet 82 which may also act as a valve stem guide is threaded in place on the complementary threads of the seat and guide member 80.

The valve stem 84 extends outwardly of the bonnet 82 whereby the valve may be manually operated, the stem extending through suitable guide passages 86 and 88 in the bonnet 82 and seat and guide member 80, the stem being provided adjacent the lower end thereof with the poppet or movable seat member 90. Spring 92 is interposed between the seat and guide member 80 and the movable seat member 90, urging the movable seat member downwardly toward valve closing position, the opening of the movable seat member 90 being limited by shoulder 93. The housing 76 is provided with the vent openings 94, and said housing member is threaded adjacent its lower end as at 96 for accommodating complementary threads of the lower body member 98. Said body member 98 is preferably provided with the shoulders 100 for facilitating assembly of the valve assembly, and is provided with threads 102 for application of the valve assembly to the mechanism to be vented.

The member 98 is provided with the passage 104 which may form a guide for the lower skirt 106 of the movable seat member 90, though such a guide and skirt are not necessary; but where such skirt is used, suitable apertures 108 are provided therethrough for permitting the passage of fluid upwardly of passage 104 and upwardly through vents 94.

Body member 98 and movable seat member 90 may be provided with facing flanges 110 and 112 and are provided with facing segmental spherical seating surfaces 114 and 116 adapted to be engaged by the edges of the flexible ring 118, similar to any of the rings above referred to, it being understood that such rings may be used for the rings 118 either singly or in multiple. As before, the ring 118 is flexible, springy and resilient, and not plastic or malleable and resiliently conforms to the spherical surfaces over a circular contact. The ring 118 is preferably of such a diameter that the tangent at the contact between the spherical surface and the edge of the ring is substantially 45 degrees to the vertical axis of the seats.

In the operation of this form of device it will be seen that multiple huddling chambers 120 and 122 are provided affecting and causing proper and desired operation, in opening and closing to prevent chattering and immediate action.

In Figure 7 there is shown a joint wherein upper and lower pipe members 124 and 126 are provided with flanges 128 and 130 adapted to be secured together by joints 132. The facing ends of the pipes are provided with the segmental spherical surfaces 134 and 136 and proper closure is effected by the flexible, resilient ring 138 similar to any of the rings heretofore described, the ring being flexible enough to conform to the surfaces 134 and 136, but springy or resilient enough not to take a permanent set, yet strong enough to take the compressive forces necessary in effecting a tight seal.

It is to be understood that I do not wish to be limited to the exact embodiment of the device shown, which is merely by way of illustration and not limitation, as various other forms of the device will, of course, be apparent to those skilled in the art without departing from the spirit of the invention and scope of the claims.

I claim:

1. In a valve assembly, the combination of a casing having an inlet and an outlet, a fixed seat member disposed therein having a seat portion of substantially spherically segmental shape provided with a passage extending therethrough, a movable seat member movable toward and away from said fixed seat member and having a seat portion of substantially spherical segmental shape extending toward the first named seat portion, and a substantially cylindrical, flexible, resilient valve ring adapted to engage said seat portions when the valve assembly is in closed condition to cut off communication between inlet and outlet, said ring being freely movable when the valve assembly is in opened condition permitting communication between said inlet and outlet.

2. In a valve assembly, the combination of a casing having an inlet and an outlet, a fixed seat member disposed therein having a seat portion thereon, said seat member having a passage extending therethrough, a movable seat member movable toward and away from said fixed seat member, said movable seat member having a seat portion thereon, and a flexible, resilient, ring valve member adapted to engage said seat portions and accommodate itself to the shape thereof when the valve assembly is in closed condition to cut off communication between inlet and outlet, said ring member being freely movable with respect to said seat members when the valve assembly is in open condition permitting communication between inlet and outlet.

3. In a valve assembly, the combination of a casing having an inlet and an outlet, a fixed seat member disposed therein having a seat portion thereon, said seat member having a passage extending therethrough, a movable seat member movable toward and away from said fixed seat member, said movable seat member having a seat portion thereon, and a member floating freely with respect to said seat members when the valve assembly is in open condition and adapted to engage said seat members when the valve assembly is in closed condition to cut off communication between inlet and outlet.

4. In combination, a pair of opposed segmental spherical seat members, one of which has a passage therethrough, one of said seat members being relatively movable with respect to the other and a ring member adapted to engage said seat members, said ring member being flexible and resilient to conform to the shape of the engaged seat members over the lines of contact between said ring and seat members when one of said seat members moves to a predetermined position, whereby said passage is closed, said ring member floating freely when one of said seat members is moved away from the other to thereby open said passage.

5. In combination, a pair of seat members, one of said seat members having a spherically segmental seat portion extending toward the other member, one of said seat members having a passage therethrough, one of said seat members being relatively movable with respect to the other and a ring member adapted to engage said seat members, said ring member being flexible and resilient to conform to the shape of the engaged seat members over the lines of contact between said ring and seat members when one of said seat members moves to a predetermined position, whereby said passage is closed, said ring member floating freely when one of said seat members is moved away from the other to thereby open said passage.

6. In a valve assembly, the combination of a casing having an inlet and an outlet, said casing having a circumferential groove adjacent said outlet, a movable seat member having spaced upwardly extending legs provided with a flange disposed in said groove whereby movement of the seat member axially of said casing is limited, said seat member having a downwardly extending substantially segmentally spherical seat portion, a lower body member secured to said casing, a fixed seat member secured to said casing by said lower body member, said fixed seat member having an upwardly extending substantially segmentally spherical seat portion extending toward said first named seat portion, said fixed seat member having a passage therethrough, and a substantially cylindrical flexible, resilient ring valve member floatingly disposed between said seat portions for permitting communication between inlet and outlet when said valve member is free to move between said seat portions but adapted to conform to the respective lines of contact between said valve member and the adjacent seat portions and thus cut off communication between said inlet and outlet when said movable seat member moves toward the fixed seat member a predetermined amount.

7. In a valve assembly, the combination of a casing having an inlet and an outlet, a movable seat member, means for limiting the movement of said movable seat member with respect to said casing, said seat member having a downwardly extending substantially segmentally spherical seat portion, a fixed seat member secured to said casing below said movable seat member and having an upwardly extending substantially segmentally spherical seat portion extending toward said first named seat portion, said fixed seat member having a passage therethrough, and a substantially cylindrical flexible, resilient ring valve member floatingly disposed between said seat portions for permitting communication between inlet and outlet when said valve member is free to move between said seat portions but adapted to conform to the respective lines of contact between said valve member and the adjacent seat portions and thus cut off communication between said inlet and outlet when said movable seat member moves toward the fixed seat member a predetermined amount.

8. In a valve assembly, the combination of a casing having an inlet and an outlet, a movable seat member, means for limiting the movement of said movable seat member with respect to said casing, said seat member having a substantially segmentally spherical seat portion, a fixed seat member secured to said casing adjacent said movable seat member and having a substantially segmentally spherical seat portion extending toward said first named seat portion, one of said seat members having a passage therethrough, and a substantially cylindrical flexible, resilient ring valve member floatingly disposed between said seat portions for permitting communication between inlet and outlet when said valve member is free to move between said seat portions but adapted to conform to the respective lines of contact between said valve member and the adjacent seat portions and thus cut off communication between said inlet and outlet when said movable seat member moves toward the fixed seat member a predetermined amount.

9. In a valve assembly, the combination of a casing having an inlet and an outlet, a fixed seat member disposed therein having a seat portion of substantially spherically segmental shape, a movable seat member movable toward and away from said fixed seat member and having a seat portion of substantially spherical segmental shape extending toward the first named seat portion, one of said seat members having a passage therethrough permitting communication between inlet and outlet, and a substantially cylindrical, flexible, resilient valve ring adapted to engage said seat portions when the valve assembly is in closed condition to cut off communication between inlet and outlet, said ring being freely movable when the valve assembly is in opened condition permitting communication between inlet and outlet.

10. In a valve assembly, the combination of a casing having an inlet and an outlet, a fixed seat member disposed therein having a seat portion thereon, a movable seat member movable toward and away from said fixed seat member, said movable seat member having a seat portion thereon, one of said seat members having a passage therethrough permitting communication between inlet and outlet, and a flexible, resilient, ring valve member adapted to engage said seat portions and accommodate itself to the shape thereof when the valve assembly is in closed condition to cut off communication between inlet and outlet, said ring member being freely movable with respect to said seat members when the valve assembly is in open condition permitting communication between inlet and outlet.

11. In a valve assembly, the combination of a casing having an inlet and an outlet, a fixed seat member disposed therein having a seat portion thereon, a movable seat member movable toward and away from said fixed seat member, said movable seat member having a seat portion thereon, one of said seat members having a passage therethrough permitting communication between inlet and outlet, and a flexible, resilient ring valve member adapted to engage said seat portions and accommodate itself to the shape thereof when the valve assembly is in closed condition to cut off communication between inlet and outlet, said ring member being freely movable with respect to said seat members when the valve assembly is in open condition permitting communication between inlet and outlet, said ring valve member having a wall of substantially constant section thickness.

12. In a valve assembly, the combination of a casing having an inlet and an outlet, a fixed seat member disposed therein having a seat portion thereon, a movable seat member movable toward and away from said fixed seat member, said movable seat member having a seat portion thereon, one of said seat members having a passage therethrough permitting communication between inlet and outlet, and a plurality of flexible, resilient, ring valve members adapted to engage said seat portions and accommodate themselves to the shape thereof when the valve assembly is in closed condition to cut off communication between inlet and outlet, said ring members being freely movable with respect to said seat members when the valve assembly is in open condition permitting communication between inlet and outlet.

13. In a valve assembly, the combination of a casing having an inlet and an outlet, a fixed seat member disposed therein having a seat portion thereon, a movable seat member movable toward and away from said fixed seat member, said movable seat member having a seat portion thereon, one of said seat members having a passage therethrough permitting communication between inlet and outlet, and a plurality of flexible, resilient, ring valve members adapted to engage said seat portions and accommodate themselves to the shape thereof when the valve assembly is in closed condition to cut off communication between inlet and outlet, said ring members being freely movable with respect to said seat members when the valve assembly is in open condition permitting communication between inlet and outlet, the wall section and length of said rings being such that certain of said rings take a majority of the compressive stresses in closing and other of the rings perform the greater sealing action.

14. In a valve assembly, the combination of a casing having an inlet and an outlet, a fixed seat member disposed in said casing and having a seat portion of substantially spherically, segmental shape, a movable seat member having a seat portion of a substantially spherically, segmental shape, and a substantially cylindrical, flexible, resilient valve ring adapted to engage said seat portions and conform to the shape thereof when the movable seat member is in closed condition, the length and material of said ring being such that it will readily deform to completely contact the spherical seat portions over the entire contact edges of said ring when said seat portions are in a predetermined position with respect to each other to sever communication between inlet and outlet, one of said seat members having a passage communicating with inlet and outlet when said movable seat member is in open condition, said ring being freely movable when said movable seat member is in open condition, said movable seat member being movable to closed condition to sever communication between inlet and outlet.

15. In a valve assembly, the combination of a casing having an inlet and an outlet, a fixed seat member disposed in said casing and having a seat portion thereon, a movable seat member disposed in said casing and having a seat portion relatively movable with respect to the other seat portion when the valve assembly is being opened or closed, one of said seat portions having a passage therethrough for communicating with inlet and outlet when the valve asembly is in open condition, and a ring member adapted to engage said seat members, said ring being freely movable when said movable seat member is in open condition, said ring member being flexible and resilient to conform to the shape of the engaged seat members over the lines of contact between said ring and seat members, when one of said seat members is disposed in a predetermined position to sever communication between inlet and outlet through said passage.

16. In a valve assembly, the combination of a fixed seat member having a seat portion of substantially spherically, segmental shape, a movable seat member having a seat portion of a substantially spherically, segmental shape, and sleeve means interposed between said seat portions adapted to engage said seat portions, said sleeve means comprising a substantially cylindrical, flexible, resilient ring capable of distortion to contact the spherical seat portions over the entire respective edges of said ring to form a seal between the fixed and movable seat portions, and a ring encircling said resilient valve ring and contacting said seat members, said encircling ring being of less flexible material than said first named ring, said rings being freely movable when said movable seat member is in open condition.

17. In a valve assembly, the combination of a casing having an inlet and an outlet, a movable seat member disposed without thrust thereon in said casing and having a substantially segmentally spherical seat portion, a fixed seat member provided in said casing and having a substantially segmentally spherical seat portion, said fixed seat member having a passage therethrough, and a substantially cylindrical, flexible, resilient ring valve member floatingly disposed between said seat portions for permitting communication between inlet and outlet when said valve member is free to move between said seat portions, but adapted to contact the spherical seat portions over the entire respective edges of said valve member and thus cut off communication between said inlet and outlet when said movable seat member moves toward the fixed seat member a predetermined amount.

18. In a valve assembly, the combination of a casing having an inlet and an outlet, said casing having a circumferential groove adjacent said outlet, a movable seat member having spaced legs each provided with a flange disposed in said groove whereby movement of the seat member axially of the casing is limited, said seat member being mounted without any thrust urging said seat member in any direction when said valve member is inoperative, said seat member having a substantially segmentally spherical seat portion, a lower body member secured to said casing, a fixed seat member secured to said casing by said lower body member, said fixed seat member having a substantially segmentally spherical seat portion, a substantially cylindrical flexible resilient ring valve member floatingly disposed between said seat portions for permitting communication between inlet and outlet when said valve member is free to move between said seat portions, but adapted to contact the spherical seat portions over the entire respective edges of said valve member and thus cut off communication between said inlet and outlet when said movable seat portion moves toward the fixed seat member a predetermined amount.

19. In a valve assembly, the combination of a casing having an inlet and an outlet, a fixed seat member disposed in said casing and having a seat portion of substantially spherically segmental shape provided with a passage therethrough, said passage communicating with said inlet and outlet, a movable seat member movable toward and away from said fixed seat member to control the connection between said inlet and outlet, said movable seat member having a seat portion of a substantially spherically segmental shape, and floating means interposed between said seat portions adapted to engage said seat portions when the valve assembly is in closed condition to cut off communication between said inlet and outlet, said floating means being freely movable when the valve assembly is in open condition permitting communication between said inlet and outlet, said floating means comprising a substantially cylindrical resilient valve ring capable of distortion to contact the spherical seat portions over the entire respective edges of said ring to form a seal between the fixed and movable seat portions, and a compression ring embracing said resilient valve ring for supporting the load between said seat portions when the valve assembly is in closed condition and the resilient valve ring has formed a seal between the fixed and movable seat portions.

20. In a valve assembly, the combination of a casing having an inlet and an outlet, a fixed seat member disposed therein having a seat portion thereon, a movable seat member having a seat portion thereon, said seat portions being segmentally spherical in shape, and a plurality of flexible, resilient, ring valve members adapted to engage said seat portions and accommodate themselves to the shape thereof, one of said seat members having a passage therethrough permitting communication between inlet and outlet when the movable seat member is in one position, said movable seat member preventing communication between inlet and outlet when said movable seat member is in another position, said ring members being freely movable when said movable seat member is in open condition.

KENLY C. BUGG.

REFERENCES CITED

The following references are of record in the file of this patent:

UNITED STATES PATENTS

| Number | Name | Date |
| --- | --- | --- |
| Re. 17,022 | Wilson | July 3, 1928 |
| 484,843 | Bauer | Oct. 25, 1892 |
| 517,914 | Bauer | Apr. 10, 1894 |
| 697,662 | Reese | Apr. 15, 1902 |
| 1,665,810 | Gillick | Apr. 10, 1928 |
| 1,746,855 | French | Feb. 11, 1930 |
| 1,793,850 | Halstead | Feb. 24, 1931 |
| 1,925,335 | Murphy | Sept. 5, 1933 |
| 2,330,610 | Natter | Sept. 28, 1943 |

FOREIGN PATENTS

| Number | Country | Date |
| --- | --- | --- |
| 754,048 | France | 1933 |

Certificate of Correction

Patent No. 2,479,554 August 23, 1949

KENLY C. BUGG

It is hereby certified that errors appear in the printed specification of the above numbered patent requiring correction as follows:

Column 2, line 31, for "cororsion" read *corrosion*; column 4, line 52, for the words "shown as in" read *shown in*; column 5, line 24, after "fluid" insert a semicolon; line 47, for "sperical" read *spherical*;

and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*